United States Patent [19]

Aizawa et al.

[11] 4,196,995
[45] Apr. 8, 1980

[54] ELECTRONICALLY OPERATED MAGNETIC CONTROL DEVICE FOR CAMERA

[75] Inventors: Hiroshi Aizawa, Kawasaki; Masanori Uchidoi, Yokohama; Nobuaki Date, Kawasaki; Masami Shimizu, Tokyo, all of Japan

[73] Assignee: Canon Kabushiki Kaisha, Tokyo, Japan

[21] Appl. No.: 917,330

[22] Filed: Jun. 20, 1978

[30] Foreign Application Priority Data

Jul. 5, 1977 [JP] Japan .................... 52-80106

[51] Int. Cl.² ............................................. G03B 9/58
[52] U.S. Cl. ......................... 354/234; 361/159
[58] Field of Search ............. 354/50, 51, 60 R, 234, 354/235, 271, 43; 361/159

[56] References Cited

U.S. PATENT DOCUMENTS

| | | | |
|---|---|---|---|
| 3,953,867 | 4/1976 | Kondo | 354/234 X |
| 4,001,844 | 1/1977 | McClintock | 354/235 X |
| 4,012,751 | 3/1977 | Espig | 354/234 |
| 4,104,666 | 8/1978 | Toyoda et al. | 354/234 |

*Primary Examiner*—Michael L. Gellner
*Attorney, Agent, or Firm*—Toren, McGeady and Stanger

[57] ABSTRACT

The disclose circuit energizes a magnetic winding of a shutter actuating device. A constant voltage circuit is connected across the magnetic winding, or between the power supply terminal of the magnetic winding and a basic potential to ensure that the response of the armature of the actuating device to the output of a timing circuit is stabilized despite variation in the voltage of an electrical power source. This produces the advantage of substantially improving the accuracy of exposure control, because the closing operation of the shutter is controlled through movement of the armature.

20 Claims, 7 Drawing Figures

ELECTRONICALLY OPERATED MAGNETIC CONTROL DEVICE FOR CAMERA

BACKGROUND OF THE INVENTION

This invention relates to photographic cameras, and more particularly to electromagnetic control devices in such cameras. Still more particularly, it relates to the stabilization of an electric impulse for energizing a magnetic winding of such device.

Recently, the electromagnetic control devices have found wide use in photographic cameras. In still cameras having electrically timed shutters, this device is generally constructed to be responsive to the output of a timing circuit and arranged to control the closing movement of the shutter. In cine cameras, the period of actuation of the shutter drive means is controlled by an electromagnetic actuating device. In any case, efforts have been made to eliminate inconvenience in handling and portability of cameras. To do this it is necessary that the electrical power source or battery which is utilized in energizing a magnetic winding of the device be of small size so that the resulting output and capacity is small. This arises from the restriction of the space which the battery is intended to occupy. For this reason, it is of great importance to minimize consumption of electrical energy of the battery by the magnetic actuating device from the standpoint not only of preventing premature consumption of the battery but also of assuring a satisfactory dynamic range of exposure control even at lowered temperatures. The internal resistance of the battery is increased with decrease in temperature.

Energization of the magnetic winding continues during the period of actuation of the shutter, that is, from the initiation to the termination of an exposure. Hence the current flowing through the magnetic winding, however small its intensity may be, reaches a considerable level particularly when the shutter time is long. To avoid this, mechanical subsidiary means have been arranged to be moved away from the armature of the magnetic actuating device at an appropriate time interval before the termination of duration of an exposure time, while simultaneously permitting the start of energization of the magnetic winding. At that termination, the magnetic winding is de-energized in response to the output of a timing circuit, causing movement of the armature through which the shutter is closed. Such shutter arrangement gives rise to the problem of increasing the production cost of the camera owing to the resulting complicated mechanical construction. At the same time, it involves lowering the reliability of exposure control.

Attempts have been made to overcome the above-mentioned drawbacks by employing a permanent magnet in association with the electromagnet, as for example, disclosed in U.S. Pat. No. 4,020,433 (issued Apr. 26, 1977). Here the permanent magnet is arranged in the magnetic circuit of the device so that the armature is attracted by the magnetic flux of the permanent magnet. When the magnetic winding is energized, this magnetic flux is cancelled to permit movement of the armature under the action of a bias spring by which the shutter is driven to operate. Thus, remarkable reduction of consumption of the electrical energy can be achieved without an unduly large increase in complexity of mechanical construction and arrangement of the shutter control. The use of the permanent magnet leads to the production of what is called a moving coil type magnetic actuating device in which the magnetic winding, upon energization, is moved relative to the permanent magnet. Such movement of the magnetic winding is translated to control actuation of the shutter, or a trigger for the various portions of the camera mechanism.

With these two conventional types of magnetic actuating devices, though the efficiency of usage of the electrical energy is remarkably improved as compared with the aforesaid overallperiod power supply type magnetic actuating device, the magnetic resistance in the magnetic circuit is substantially larger than that in the overall-period power supply type because of the permanent magnet or the air gap which is comparatively large in the magnetic circuit. In consequence, the required value of magnetomotive force exerted in the magnetic winding is increased to an amount available from the battery which is adapted for use in the camera since the internal resistance of the battery is relatively large. A control circuit for the magnetic actuating device is, therefore, designed to include a capacitor on which a certain fraction of the electrical energy necessary to energize the magnetic winding is previously stored. Thus energization of the magnetic winding takes the form of an electric pulse or impulse.

The time lag from the moment at which an actuating signal has been produced by the timing circuit to the moment at which the armature or the moving coil starts to move varies, depending upon the magnitude of the electric impulse. The present inventors have now found from many experiments and analysis that, with the moving-coil type actuating device, when the voltage of the battery is varied by 2 volts, the variation of the time lag reaches 1 millisecond, as shown by a dashed line curve in FIG. 1. With the armature type actuating device, the variation of the time lag ranges from 0.2 to 0.5 milliseconds, as shown by a solid line curve.

Since the response of the composite magnet depends upon the various parameters such as magnetic permeability and saturation flux density characteristic of the magnetic circuit, and the response of the driven mechanism depends upon the force of the spring means, the inertia and the like, the range of variation of the time lag can be reduced to some extent by proper selection of these design parameters. Because of the presence of the comparatively large air gap of the permanent magnet in the magnetic circuit, and, therefore, of the creation of the extremely large magnetic resistance as compared with the overall-period power supply type magnetic actuating device, the degree of freedom of parameter-selection is extremely restricted. This makes it difficult to maintain the response of the entire system at a certain constant level as the actual voltage of the battery varies.

This problem becomes serious when a highly accurate exposure control is desired even at faster shutter speeds, or when such magnetic control device is utilized in adjusting the size of diaphragm aperture. Particularly with a camera having various electronic control devices supplied with electrical power from a common battery, various photographic conditions which may be encountered result in a large difference in the amount of electrical energy used up at a time. This leads to a large range of variation of the voltage across the terminals of the battery due to the internal resistance thereof. Further, this internal resistance is varied with ambient temperature, thus the accuracy of exposure control is substantially decreased.

SUMMARY OF THE INVENTION

An object of the present invention is to provide an electromagnetic control device for use in a photographic camera.

Another object is to provide an electromagnetic control device for actuating a portion of the camera mechanism while limiting the consumption of electrical energy to a minimum.

Another object is to provide an electric impulse stabilizing circuit for energizing a magnetic winding of such device.

Another object is to provide an electromagnetic actuating device for controlling movement of members of a camera shutter with high accuracy and reliability.

These and other objects and features of the present invention will become apparent from the following detailed description of the preferred embodiments thereof taken in conjunction with the accompanying drawings in which:

DESCRIPTION OF THE PREFERRED EMBODIMENTS

Figure 1:
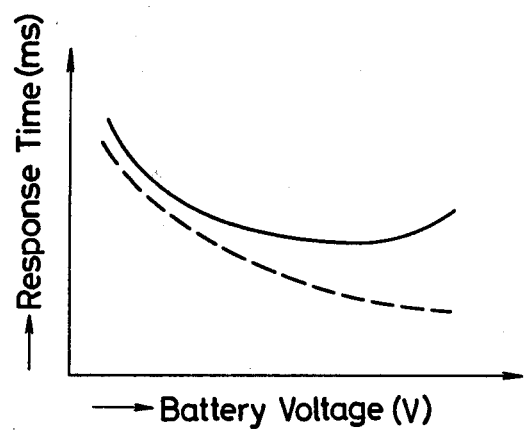
FIG. 1 is a graph showing the dependency of the response of a conventional electromagnetic actuating device on the actual voltage of a battery.
Figure 2:
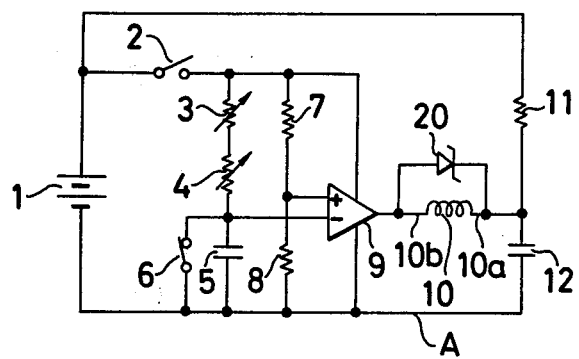
FIG. 2 is an electrical circuit diagram of one embodiment of an electromagnetic actuating device according to the present invention associated with a shutter control circuit.
Figure 6:
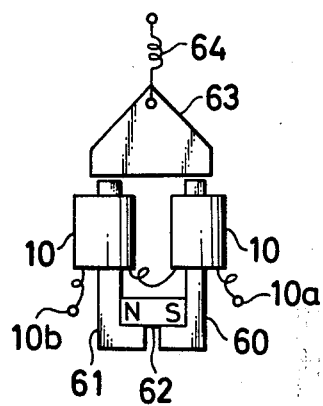
FIG. 6 is an elevational view of an electromagnetic actuating device with a magnetic winding connected in any one of the circuits of FIGS. 2 to 5.

FIGS. 2 and 6, show one embodiment of an electromagnetic actuating device according to the present invention, which is adapted to control closing of a camera shutter not shown. In FIG. 2, a timing and switching circuit and an impulse forming and stabilizing circuit are supplied with electrical power from a common battery 1. In the timing circuit a first variable resistor 3 has a resistance value related to the adjusted value of the shutter speed and is connected through a normally open power supply control switch 2 to the positive terminal of the battery 1. A second variable resistor 4 connected in series with the first resistor 3 compensates for the difference in response characteristics of different shutter arrangements. A timing capacitor 5 is connected between the resistor 4 and the negative terminal of the battery 1, and a switch 6 is connected across the capacitor 5 and arranged to be opened during the opening operation of the shutter performs. In the switching circuit a reference voltage source or voltage divider is composed of resistors 7 and 8 connected in series to each other between the switch 2 and the negative bus. A comparator 9 is connected at one input (+) to the output of the voltage divider and at another input (−) to the output of the timing circuit.

The impulse forming circuit for energizing a magnetic winding 10 of the actuating device comprises a storage capacitor 12 connected at one pole to the positive terminal of the battery 1 through a charging resistor 11 and at the opposite pole to the negative bus A. The magnetic winding 10 is connected between the output of the comparator 9 and a point between the resistor 11 and the capacitor 12. The impulse stabilizing circuit is constructed in the form of a constant voltage circuit composed of a single voltage regulating element, in this instance, a Zener diode 20 with its anode connected to the output of the comparator 9 and with its cathode connected to the positive pole of the storage capacitor 12. In other words, the Zener diode 20 is connected in a normal direction across the magnetic winding 10. The Zener diode is adjusted in breakdown point to 3 volts, for example, as is determined on assumption that the acceptable accuracy of operation of the timing circuit is secured with the battery 1 of a voltage ranging from 5 to 3.5 volts.

FIG. 6 shows a schematic example of the mechanical part of the electromagnetic actuating device which is of the fixed-coil moving-armature type. The magnetic winding 10 of FIG. 2 is formed around two arms 60 and 61 of a yoke with a permanent magnet 62 sandwiched between the arms 60 and 61. Positioned adjacent the forward ends of the arms 60 and 61 is an armature 63 of triangular shape. When the magnetic winding 10 remains de-energized, the armature 63 is attracted by the magnetic force of the permanent magnet 62 against the force of a drive spring 64. When the winding 10 is energized to cancel the magnetix flux of the permanent magnet 62, the armature 63 is moved away from the yoke to actuate a control member not shown for the closing operation of the shutter.

Figure 7:
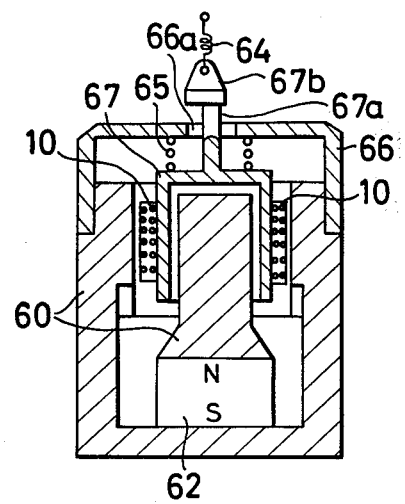
FIG. 7 is a sectional view of a moving-coil type electromagnetic actuating device usuable in the invention.

A moving-coil type actuating device is shown in FIG. 7 wherein the same reference numerals have been employed to denote similar and like parts of FIG. 6. A coil 10 equivalent to the magnetic winding 10 of FIG. 6 is mounted on a movable support 67. This assembly is arranged within a space provided in a yoke 60 so as to surround a central section thereof. The support 67 is biased by a spring 64 connected between the camera housing not shown and a projection 67a, the latter extending through and outwardly beyond a hole 66a provided through the wall of an upper panel 66. A buffer spring 65 is positioned between the support 67 and the upper panel 66. The forward end 67b of the projection 67a is formed as an armature having the same function as that of FIG. 6.

The operation of the electromagnetic actuating device is as follows. Let us now assume that the actual voltage of the battery 1 is, for example, 5 volts, above a satisfactory operating level. Prior to the making of an exposure, the operator need to set a desired value of shutter speed in the variable resistor 3. It is further assumed that the second variable resistor 4 is appropriately adjusted to enable a particular actuating device to perform in an optimum manner with a particular shutter mechanism.

When a shutter release button not shown is depressed to close the power supply control switch 2, so the shutter control circuit is rendered operative. Then, a diaphragm in a lens mount not shown is closed down to a preset value, and then a reflex mirror not shown, is flipped upward. Such movement of the mirror causes opening operation of the shutter to start with the initiation of an exposure. At this time, the count start switch 6 is opened so that the timing capacitor 5 is charged through the resistors 3 and 4. The voltage on the capacitor 5 is increased, and reaches a level coincident with the reference voltage when the duration of the time interval set in the resistor 3 is terminated. Hence the output voltage of the comparator 9 changes to zero potential. This causes the magnetic winding 10 to be energized by an electric pulse or impulse with power mainly from the storage capacitor 12. The charge on the capacitor 12 is suddenly discharged through the magnetic winding 10 and the comparator 9 to the negative bus A, while the voltage across the magnetic winding 10 regulated to 3 volts. Accordingly, the armature 63 or 67b of FIG. 6 or 7 respectively is abruptly moved by the spring 64 with an improved accuracy in response to the occurrence of the impulse. A rear curtain of the shutter not shown is then released from the cocked position to terminate the exposure.

Alternately assuming that the actual voltage of the battery 1 is lowered to about 3.5 volts. Even in this case, the voltage appearing across the magnetic winding 10 is maintained at the same level as that when the battery 1 provides 5 volts. Therefore, the response of the armature 63 or 67b remains unchanged. This makes it possible to achieve a high accuracy of exposure control regardless of the variation of the voltage of the battery 1. After the shutter release button returns to the initial position, the switch 2 is opened to cut off the power supply from the timing and switching circuit. By subsequent operation of a film winding and shutter cocking mechanism not shown, the switch 6 is closed, and the armature 63 or 67b is moved backward to the initial position shown in FIG. 6 or 7.

Figure 3:
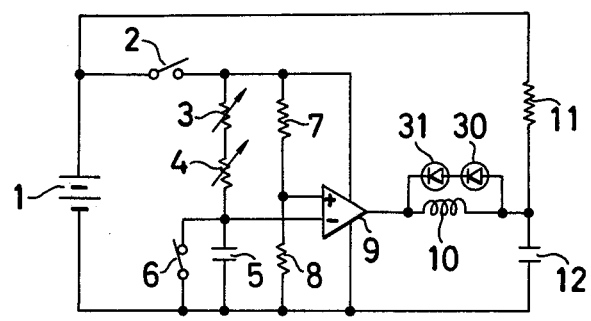
FIGS. 3 and 4 are similar diagrams showing two examples of modification of the impulse stabilizing circuit of FIG. 2.

FIG. 3 shows another example of the impulse stabilizing circuit as constructed by replacing the Zener diode 20 of FIG. 2 by a string of light-emitting diodes 30 and 31. These diodes 30 and 31 are connected in a forward direction across the magnetic winding 10 to provide an almost constant voltage drop regardless of the variation of the voltage of the battery 1. The diodes 30 and 31 are arranged to be visible either from the outside of the camera housing, or in the viewfield of the finder.

Figure 4:
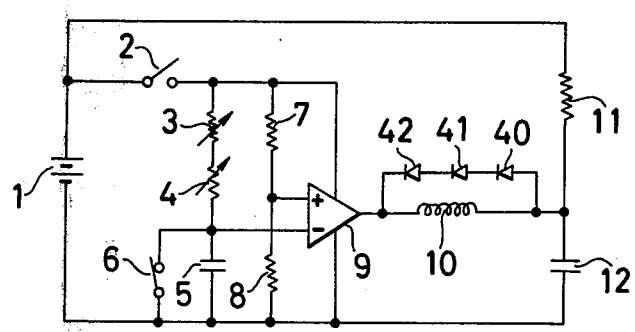

FIG. 4 shows still another example of the impulse stabilizing circuit as constructed by substituting a string of commonly available diodes 40, 41 and 42 for the light-emitting diodes 30 and 31 of FIG. 3. In this case also, the magnetic winding 10 is energized at a constant voltage thereacross.

Figure 5:
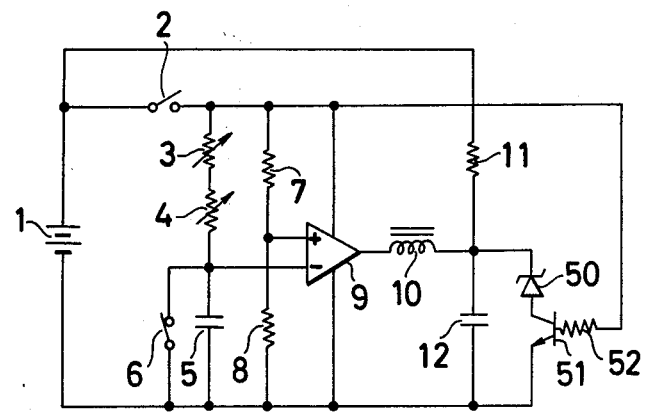
FIG. 5 is a similar diagram of another embodiment of the invention.

FIG. 5 shows a further example of the impulse stabilizing circuit of the invention. Here a Zener diode 50 has a cathode connected to the connection between the resistor 11 and the storage capacitor 12. An npn transistor 51 with a collector connected to the anode of the Zener diode 50. The emitter of transistor 51 connected to the negative pole of the storage capacitor 12, and the base connected through a resistor 52 to the common power supply control switch 2 of the timing circuit. When the shutter release button is depressed to close the switch 2, a base current flows to the transistor 51 to clamp the voltage on the storage capacitor 21 at the sum of a reverse blocking voltage of the Zener diode 50 and an emitter-collector voltage Vce of the transistor 51. Thus the voltage appearing across the magnetic winding 10 at the time of application of an impulse from the storage capacitor 12 is adjusted to a constant level, even when the actual voltage of the battery 1 is varied.

It is of course possible to factor the voltage loss into an otherwise constructed electronic device associated with the timing circuit. In this case, however, a high unit cost production technique must be employed as compared with the present invention.

While embodiments of the invention have been described in detail, it will be evident to those skilled in the art that the invention may be practiced otherwise without departing from its spirit and scope.

What is claimed is:

1. A drive circuit for driving the magnetic coil of an electromagnet in a camera with electrical power from a power source forming a plurality of potentials, comprising:
   (a) constant voltage supply means connected between a terminal of a magnetic coil of said electromagnet and a potential in a manner to supply a constant drive voltage in the forward direction to said electromagnet when said electromagnet is energized.

2. A drive circuit of an electromagnet for a camera according to claim 1, wherein said constant voltage supply means is formed by a constant voltage element connected in parallel and in a forward direction to said magnetic coil.

3. A drive circuit of an electromagnet for a camera according to claim 2, wherein said constant voltage element is a diode.

4. A drive circuit of an electromagnet for a camera according to claim 2, wherein said constant voltage element is a Zener diode.

5. A drive circuit of an electromagnet for a camera according to claim 2, wherein said constant voltage element is formed by a plurality of light-emitting diodes.

6. A drive circuit of an electromagnet for a camera according to claim 5, wherein said plurality of light-emitting diodes are connected in series with each other.

7. A release type electromagnet for a camera to be driven by electrical power from an electrical power source battery comprising:
   (a) constant voltage supply means connected between the power supply terminal of a magnetic coil of said electromagnet and a basic potential in a manner to supply a drive voltage of forward direction to said electromagnet when said electromagnet is energized, and
   (b) storing means on which a charge to be discharged through said magnetic coil when said electromagnet is energized is previously charged and which is connected to the power supply terminal of said electromagnet.

8. A release type electromagnet for a camera according to claim 7, wherein said storing means consists of a capacitor.

9. A drive circuit for connection to a power source and for driving a camera shutter, comprising:
   a timing circuit for starting a timing operation upon the shutter being opened and for producing a signal at the end of a time period;
   switch means for connecting the timing circuit to the source;
   a capacitor for storing energy;
   charging means for the capacitor;
   coil means for closing the shutter;
   a constant voltage device; and
   circuit means connecting said charging means to said capacitor and the power source for charging the capacitor continuously during use of the camera and for connecting said coil means between the capacitor and the timing circuit while connecting the constant voltage device to the capacitor so as to cause the capacitor to discharge through the coil in response to a signal from the timing circuit at a constant voltage limited by the constant voltage device.

10. An apparatus as in claim 9, wherein said circuit means connects constant voltage device from the capacitor across said coil means.

11. A device as in claim 9, wherein said circuit means connects said constant voltage device across said capacitor.

12. A device as in claim 9, wherein said timing circuit produces a signal which departs from the voltage level appearing across said capacitor.

13. A device as in claim 12, wherein said circuit means connects constant voltage device from the capacitor across said coil means.

14. A device as in claim 12, wherein said circuit means connects said constant voltage device across said capacitor.

15. A device as in claim 9, wherein said constant voltage device is poled to produce a constant voltage drop during the signal from said timing circuit.

16. A device as in claim 15, wherein said circuit means connects constant voltage device from the capacitor across said coil means.

17. An apparatus as in claim 15, wherein said circuit means connects said constant voltage device across said capacitor.

18. A drive circuit for driving the magnetic coil of an electromagnet in a camera with electric power from a power source forming a plurality of potentials, comprising:
   (a) constant voltage supply means connected across the magnetic coil for supplying constant drive voltage in a forward direction to said electromagnet when said electromagnet is energized.

19. A drive circuit for connection to a power source and for driving a camera shutter, comprising:
   a timing circuit for starting a timing operation upon the shutter being opened and for producing a signal at the end of the time period;
   switch means for connecting the timing circuit to the source;
   coil means for closing the shutter;
   a voltage supply arrangement;
   a constant voltage device; and
   circuit means connecting said a arrangement and said timing circuit to said coil means and said constant voltage device across said coil means for producing a constant voltage across said coil means when said timing means causes said arrangement to energize said coil means.

20. A drive circuit for connection to a power source and for driving a camera shutter, comprising:
   a timing circuit for starting a timing operation upon the shutter being opened and for producing a signal at the end of the time period;
   switch means for connecting the timing circuit to the source;
   coil means for closing the shutter and having a response time which varies with the voltage thereacross;
   voltage supply arrangement;
   response time control means for limiting the response time of said coil means; and
   circuit means connecting said timing circuit and said arrangement to said coil means and connecting said response time control means across said coil means for maintaining the response time of said coil means when said timer means causes said applicator means to energize said coil means, said response time control means including a constant voltage device connected to maintain a constant voltage across said coil means when said coil means is energized.

* * * * *